United States Patent [19]
Fukui et al.

[11] Patent Number: 6,008,911
[45] Date of Patent: Dec. 28, 1999

[54] DIGITAL IMAGE FORMING APPARATUS

[75] Inventors: Kazuyuki Fukui, Toyohashi; Yoshinobu Hada, Toyokawa; Takanobu Yamada, Toyokawa; Hiroyuki Ideyama, Toyokawa, all of Japan

[73] Assignee: Minolta Co., Ltd., Osaka, Japan

[21] Appl. No.: 08/061,225

[22] Filed: May 17, 1993

[30] Foreign Application Priority Data

May 19, 1992 [JP] Japan .................................. 4-152713

[51] Int. Cl.⁶ .................................................. H04N 1/46
[52] U.S. Cl. ............................................................. 358/518
[58] Field of Search .................................. 358/518, 523, 358/521, 458, 457, 456

[56] References Cited

U.S. PATENT DOCUMENTS

| | | | |
|---|---|---|---|
| 4,226,525 | 10/1980 | Sakamoto et al. | 355/14 D |
| 4,277,162 | 7/1981 | Kasahara et al. | 355/14 R |
| 4,367,944 | 1/1983 | Kuru | 355/14 CH |
| 4,583,834 | 4/1986 | Seko et al. | 355/14 C |
| 4,627,712 | 12/1986 | Usami | 355/14 R |
| 4,647,184 | 3/1987 | Russell et al. | 355/14 C |
| 4,647,950 | 3/1987 | Nosaki et al. | 346/160 |
| 4,674,861 | 6/1987 | Kawamura | 355/4 |
| 4,679,057 | 7/1987 | Hamada | 346/76 L |
| 4,717,964 | 1/1988 | Abe et al. | 358/283 |
| 4,728,989 | 3/1988 | Ohmori | 355/14 R |
| 4,751,569 | 6/1988 | Clinton | 358/80 |
| 4,763,199 | 8/1988 | Suzuki | 358/280 |
| 4,782,398 | 11/1988 | Mita | 358/280 |
| 4,800,442 | 1/1989 | Riseman et al. | 358/280 |
| 4,814,886 | 3/1989 | Kuge et al. | 358/293 |
| 4,816,924 | 3/1989 | Sekiya | 358/296 |
| 4,843,573 | 6/1989 | Taylor | 364/521 |
| 4,845,549 | 7/1989 | Someya | 358/75 |
| 4,864,419 | 9/1989 | Saito et al. | 358/300 |
| 4,873,428 | 10/1989 | Takeuchi et al. | 250/214 DC |
| 4,894,685 | 1/1990 | Shoji | 355/246 |
| 4,903,123 | 2/1990 | Kawamura et al. | 358/75 |
| 4,914,459 | 4/1990 | Mama et al. | 346/160 |
| 4,924,301 | 5/1990 | Surbrook | 358/75 |

(List continued on next page.)

FOREIGN PATENT DOCUMENTS

| | | |
|---|---|---|
| 51-33635 | 3/1976 | Japan . |
| 53-115233 | 10/1978 | Japan . |
| 53-116157 | 10/1978 | Japan . |
| 53-136838 | 11/1978 | Japan . |
| 55-15169 | 2/1980 | Japan . |
| 55-29869 | 3/1980 | Japan . |
| 57-76977 | 5/1982 | Japan . |
| 59-140647 | 8/1984 | Japan . |
| 59-161982 | 9/1984 | Japan . |
| 61-61566 | 3/1986 | Japan . |
| 61-94070 | 5/1986 | Japan . |
| 61-118069 | 6/1986 | Japan . |
| 61-214666 | 9/1986 | Japan . |
| 63-296062 | 12/1988 | Japan . |
| 1-196347 | 8/1989 | Japan . |
| 2-268076 | 11/1990 | Japan . |
| 2145598 | 3/1985 | United Kingdom . |

*Primary Examiner*—Sandra O'Shea
*Attorney, Agent, or Firm*—Burns, Doane, Swecker & Mathis, LLP

[57] ABSTRACT

In a digital image forming apparatus wherein a user can change a gradation curve of the density of reproduced image plotted against the input image signal obtained by reading a document, it is needed to compensate a change of color of a reproduced image accompanied by the selection of a changed gradation curve. Then, when input multi-tone image signals of R, G and B are converted to multi-tone image signals of Y, M and C for printing, the masking coefficient used for the conversion from R, G and B to Y, M and C is changed according to the changed gradation curve. Then, the multi-tone image signals of Y, M and C are converted to light quantity data of a beam for exposing a photoconductor to form an image on the photoconductor according to the gradation curve.

9 Claims, 19 Drawing Sheets

U.S. PATENT DOCUMENTS

| | | | |
|---|---|---|---|
| 4,933,776 | 6/1990 | Ikeda | 358/456 |
| 4,958,221 | 9/1990 | Tsuboi et al. | 358/80 |
| 4,958,239 | 9/1990 | Yamada et al. | 358/457 |
| 4,959,687 | 9/1990 | Katoh et al. | 355/214 |
| 4,965,664 | 10/1990 | Udagawa | 358/80 |
| 4,990,957 | 2/1991 | Nakanishi et al. | 355/228 |
| 5,018,008 | 5/1991 | Asada | 358/78 |
| 5,123,060 | 6/1992 | Cho | 382/51 |
| 5,206,686 | 4/1993 | Fukui | 355/208 |
| 5,245,419 | 9/1993 | Gu | 358/521 |
| 5,345,320 | 9/1994 | Hirota | 358/518 |

$$MC\ 3 = \begin{bmatrix} 2.18 & -0.49 & -0.10 \\ -1.10 & 2.63 & -0.53 \\ -0.08 & -1.82 & 3.32 \end{bmatrix}$$

$$MC\ 2 = \begin{bmatrix} 2.10 & -0.45 & -0.06 \\ -1.06 & 2.55 & -0.49 \\ -0.04 & -1.78 & 3.24 \end{bmatrix}$$

$$MC\ 1 = \begin{bmatrix} 2.02 & -0.41 & -0.02 \\ -1.02 & 2.47 & -0.45 \\ 0.00 & -1.74 & 3.16 \end{bmatrix}$$

$$MC\ 0 = \begin{bmatrix} 1.94 & -0.37 & 0.02 \\ -0.98 & 2.39 & -0.41 \\ 0.04 & -1.70 & 3.08 \end{bmatrix}$$

$$MC\ 4 = \begin{bmatrix} 1.86 & -0.37 & 0.02 \\ -0.98 & 2.39 & -0.41 \\ 0.04 & -1.70 & 3.08 \end{bmatrix}$$

$$MC\ 5 = \begin{bmatrix} 1.78 & -0.33 & 0.06 \\ -0.94 & 2.31 & -0.37 \\ 0.08 & -1.66 & 3.00 \end{bmatrix}$$

$$MC\ 6 = \begin{bmatrix} 1.70 & -0.29 & 0.10 \\ -0.90 & 2.23 & -0.33 \\ 0.12 & -1.62 & 2.92 \end{bmatrix}$$

Fig. 17

DIGITAL IMAGE FORMING APPARATUS

BACKGROUND OF THE INVENTION

1. Field of the Invention

The present invention relates to a digital image processor, or in detail to the gradation control of a digital image forming apparatus such as a digital printer, a digital copying machine and the like.

2. Description of the Prior Art

In the electrophotographic process in a digital printer, a digital copying machine or the like, the light quantity of the laser beam according to multi-level input image signal obtained by reading a document to reproduce an image. In the image reproduction, it is desirable that the image density (output) after the image reproduction is proportional to the read image density signal (input) obtained by reading a document. The gradation characteristic which is a relation of the output image density against the read image density signal is an important factor which affects largely the impression of a pictorial image.

Then, the light quantity of the laser beam is corrected according to the input density signal to realize the above-mentioned linear relation between the input read data and the output image density. This is called as the gamma correction.

The gradation characteristic changes subtly with the photoconductor sensitivity, the surface potential, the development bias voltage, the development characteristic and the like. Then, the image reproduction is stabilized by using automatic image density control, the gradation correction and the like to realize the linear characteristic.

In a digital image forming apparatus, the read density of a document is converted to multi-level digital data. Because nonlinear conversion of multi-level data is easy by using a look-up table or the like, various types of stabilization control and the gradation characteristic are possible for a digital image forming apparatus. (Refer for example Japanese patent laid open Publication No. 271,764/1991.)

However, the image stabilization is not perfect actually, and the quality of the reproduced image with use of the image stabilization is not satisfactory for some experienced users. Further, if a user can select the gradation characteristic in a wide range, a user can reproduce an image of his or her taste. Then, the inventors consider that the user will satisfy if he or she can change the gradation characteristic positively.

In order to make it possible for a user to change the gradation characteristic, the gradation correction and the image stabilization have to be operated simultaneously, and a process controller is required suitable for each image reproduction process.

For a color image, color masking processing to convert input image signal data usually with a linear masking coefficient is performed generally to compensate the deviations of spectral characteristics of the light source, the color toners and the like from the ideal characteristics. If a user is allowed to select a desired gradation characteristic, the color such as hue and chroma may be accompanied by the selection of the gradation characteristic, and this is a problem to be solved.

SUMMARY OF THE INVENTION

An object of the present invention is to provide a digital image forming machine wherein a user can change the gradation characteristic without affecting the color characteristic of reproduced image.

In a digital image forming apparatus wherein a user can change a gradation curve of the density of reproduced image plotted against the input image signal obtained by reading a document, it is needed to compensate a change of color of a reproduced image accompanied by the selection of a changed gradation curve. Then, when input multi-tone image signals of R, G and B are converted to multi-tone image signals of Y, M and C for printing, the masking coefficient used for the conversion from R, G and B to Y, M and C is changed according to the changed gradation curve. Then, the multi-tone image signals of Y, M and C are converted to light quantity data of a beam for exposing a photoconductor to form an image on the photoconductor according to the gradation curve.

An advantage of the present invention is that when a user changes the gradation characteristic which is an important factor for a pictorial image, only the impression is changed according to the gradation characteristic without changing the color such as hue and chroma.

BRIEF DESCRIPTION OF THE DRAWINGS

These and other objects and features of the present invention will become clear from the following description taken in conjunction with the preferred embodiments thereof with reference to the accompanying drawings, and in which:

FIG. 17 is a diagram of masking processing of Y color;

FIG. 20, including FIG. 20(a) and 20(b) are a part and the other part of the flowchart.

DETAILED DESCRIPTION OF THE PREFERRED EMBODIMENTS

Figure 1:
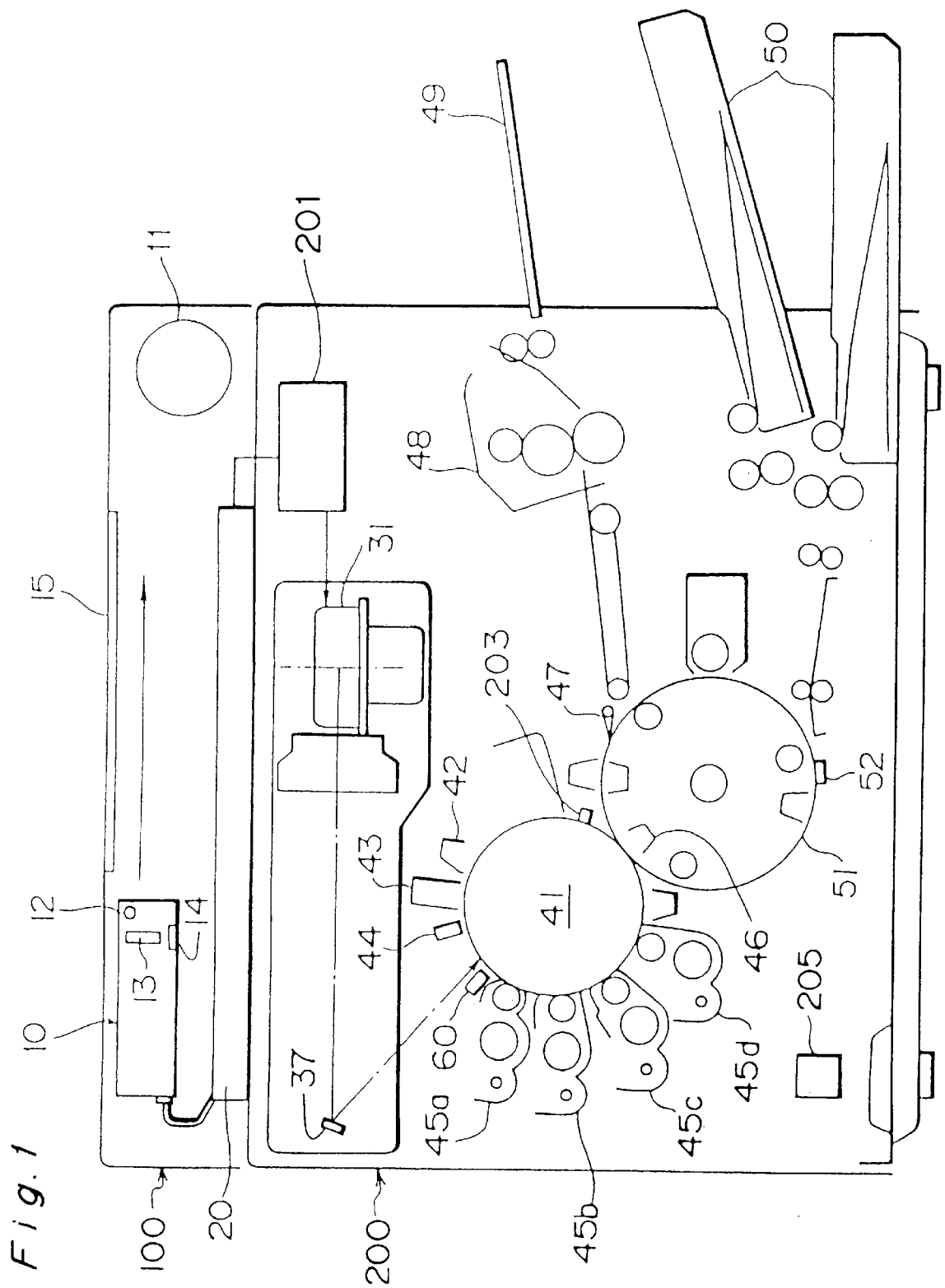
FIG. 1 is a sectional view of a digital color copying machine.

Referring now to the drawings, wherein like reference characters designate like or corresponding parts throughout the several views, an embodiment of the present invention will be explained below.

(A) Structure of Digital Color Copying Machine

FIG. 1 shows a schematic entire structure of a digital color copying machine which consists mainly of an image reader section 100 for reading a document image and a printer section 200 for reproducing the document image.

In the image reader section 100, a scanner includes an exposure lamp 12 for exposing a document put on a platen 15, a rod lens array 13 to collect reflection light from the document and a contact type CCD sensor 14 to convert the collected light to an electric signal. The scanner 10 is driven by a motor 11 to move in the direction (subscan direction) of the arrow shown in FIG. 1.

The optical image of a document illuminated by the exposure lamp 12 is converted by the CCD sensor 14 into multi-level electric signals of red (R), green (G) and blue (B). The electric signals of the three colors are converted by an image signal processor 20 to 8-bit data of yellow (Y), magenta (M), cyan (C) or black (K) and outputted to the printer controller 201.

Figure 3:
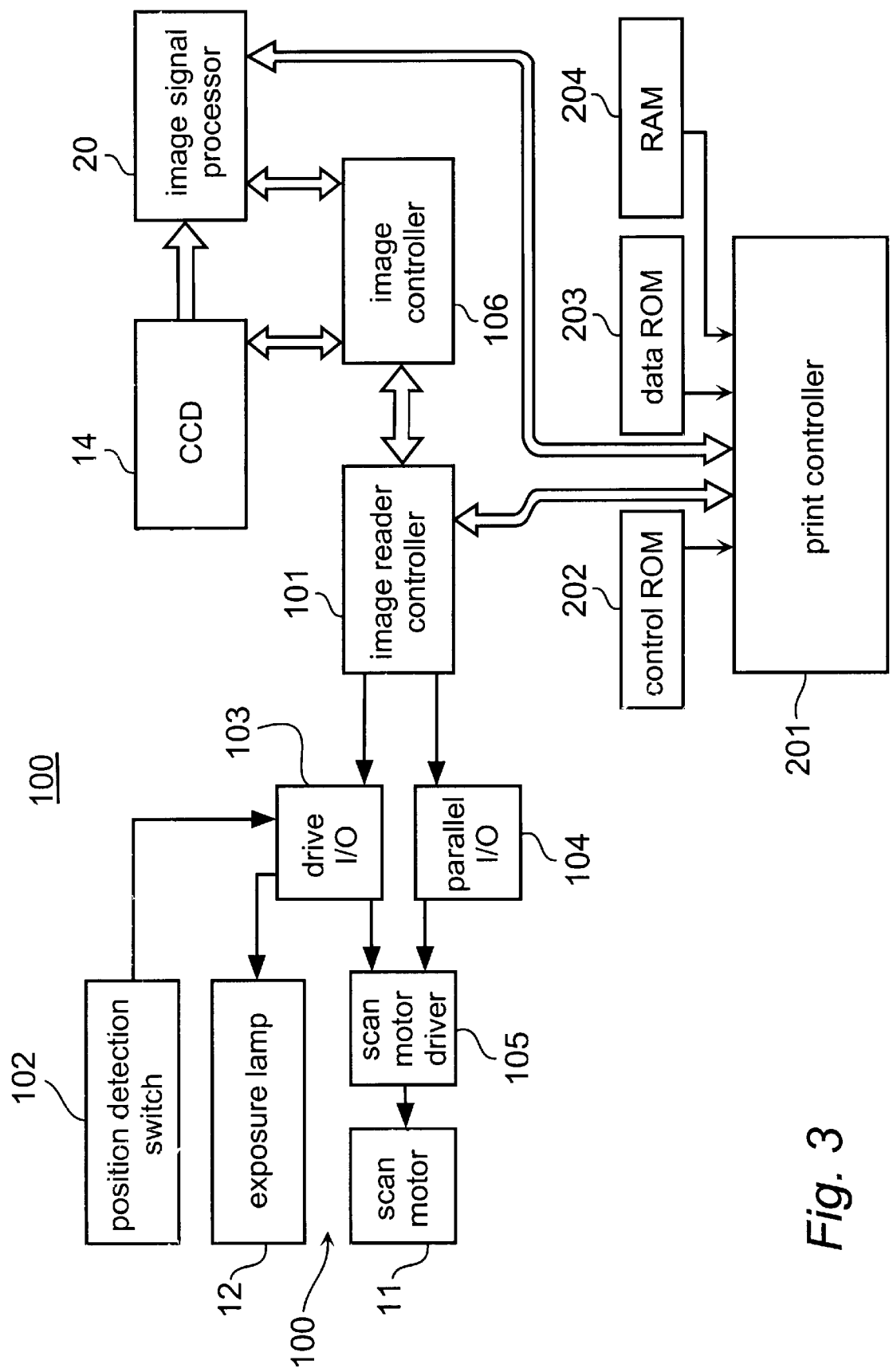
FIG. 3 is a part of a block diagram of a printer controller.

The image reader section 100 is controlled by an image reader controller 101, as shown in FIG. 3. The controller 101 controls the exposure lamp 12 via a drive I/O 103, according to a position signal of a position detection switch 102 which detects the document at a position for turning on the lamp 12. The controller 101 also controls the scan motor driver 105 via the drive I/O 103 and a parallel I/O 104. The scan motor 11 is driven by the scan motor driver 105. The image reader controller 101 is also connected to an image controller 106 which is connected to the CCD sensor 14 and to the image signal processor 20. The CCD sensor 14 and the image signal processor 20 are connected to the image controller 106 which in turn is connected to the image reader controller 101.

Figure 2:
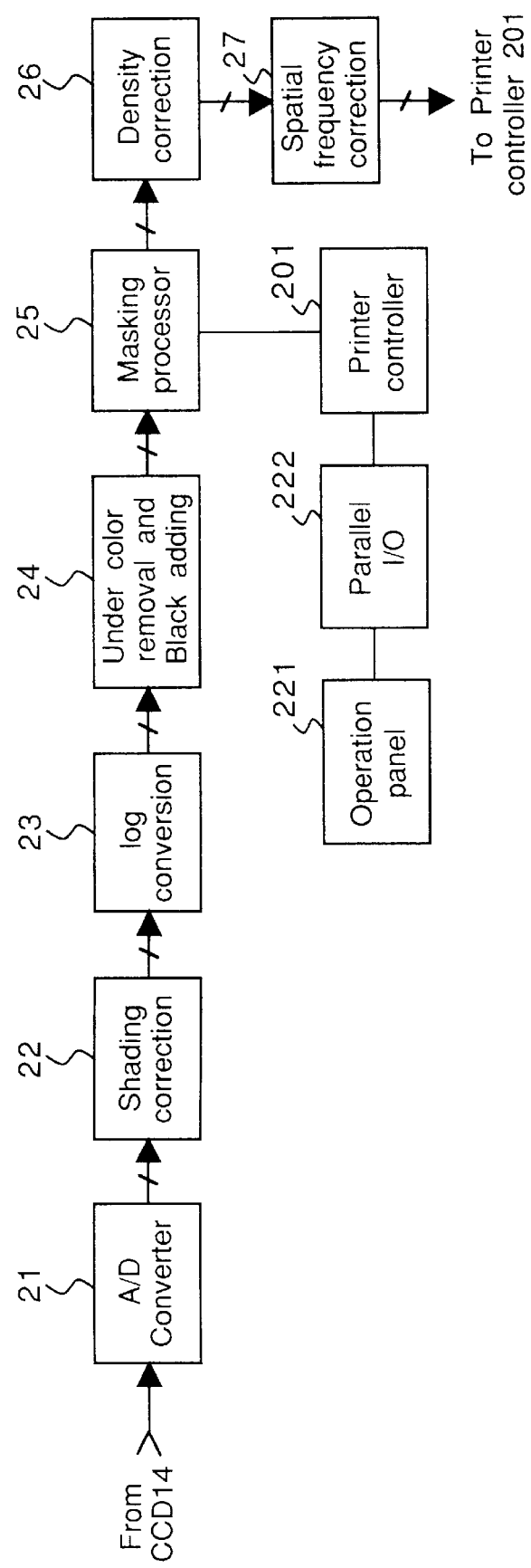
FIG. 2 is a block diagram of an image signal processor.

As shown in FIG. 2, in the image signal processor 20, the image signal obtained by the photoelectric conversion with the CCD sensor 14 is converted to multi-level digital image data of R, G and B by an analog-to-digital converter 21. The converted image data is subjected to shading correction by a shading correction section 22, and then the image data is converted to density data according to logarithmic conversion by a log conversion circuit 23. Further, an excess black is removed from the R, G, B density data and a true black data K' is generated from the density data by an under color remove/black painting circuit 24. Then, the R, G, B density data are converted to data of cyan (C), magenta (M) and yellow (Y) by a masking processor 25. Then, the C, M, Y data are multiplied with correction coefficients by a density conversion section 26 and further corrected by a spatial frequency correction circuit 27. The processed data are sent next to the printer controller 201 in the printer section 200.

In the printer section 200 shown in FIG. 1, a print head 31 performs the gamma correction of the gradation data and a dither processing if necessary, and it converts the corrected data to a digital drive signal to drive a laser diode 264 (FIG. 4) in the print head 31.

A laser beam emitted from the laser diode 264 at an intensity in correspondence to the gradation data exposes a photoconductor drum 41 under rotated, via a reflection mirror 37 as shown with a dot and dash line. Thus, a latent image of the document is formed on the photoconductor drum 41. The photoconductor drum 41 has been illuminated by an eraser lamp 42 and has been sensitized uniformly by a sensitizing charger 43 for each copy before the exposure. When the exposure is performed onto the photoconductor in the uniformly charged state, an electrostatic latent image is formed on the photoconductor drum 41. Then, one of development units 45a–45d, which provide development materials including yellow, magenta, cyan or black toners and carriers, is selected to develop the latent image on the photoconductor drum 41. On the other hand, a paper is supplied from a cassette 50 and is wound on a transfer drum 51. The developed image is transferred by a transfer charger 46 to a paper wound on a transfer drum 51.

The above-mentioned printing process is repeated four times for yellow, magenta, cyan and black. Then, the paper is separated from the transfer drum 51 with the operation of an separation claw 47, the image is fixed by a fixer 48 and the paper is carried out to a paper tray 49.

(B) Printer Controller and Image Signal Processing

Figure 4:
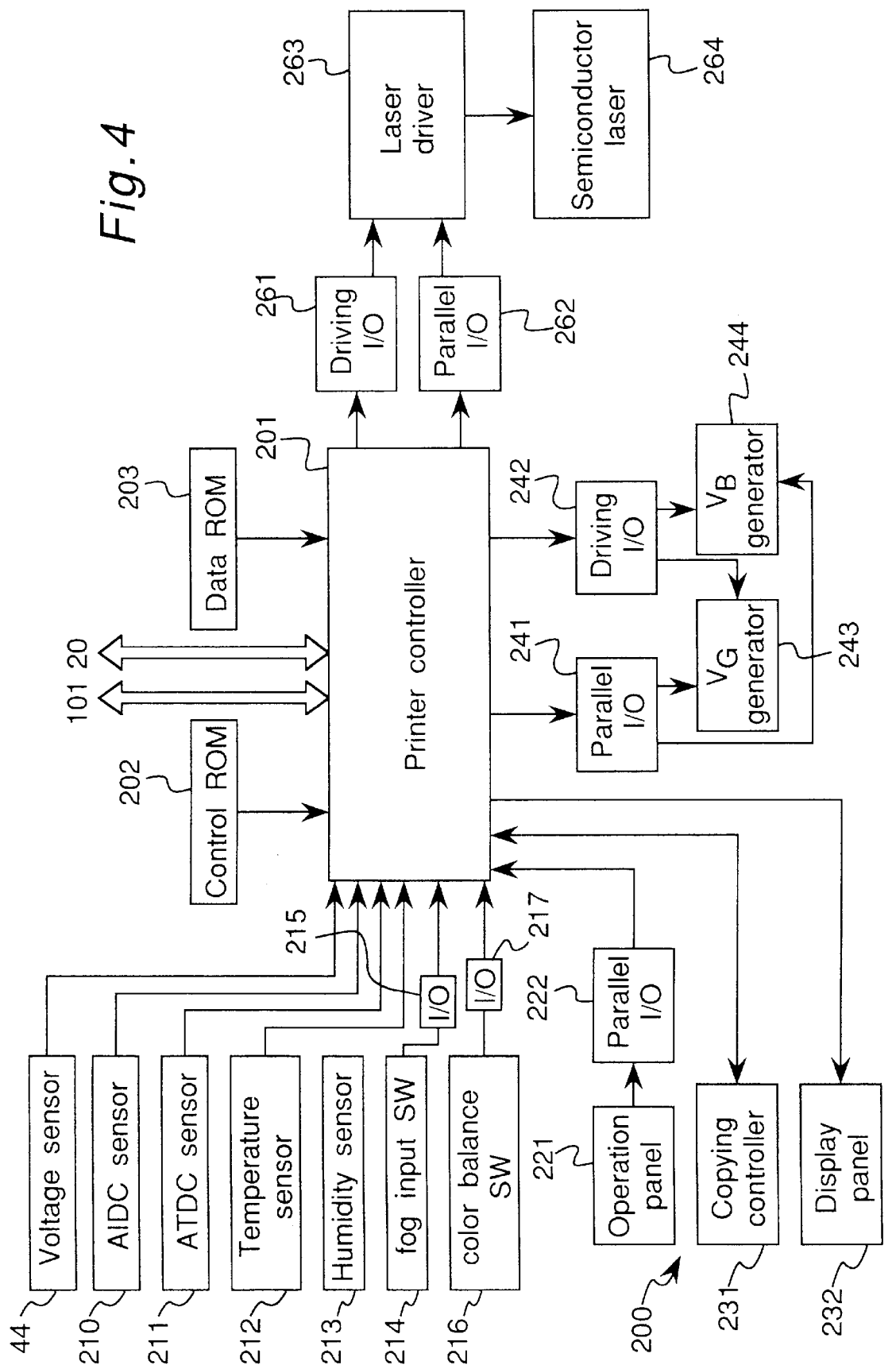
FIG. 4 is the other part of the block diagram of the printer controller.

FIGS. 3 and 4 show a block diagram of the control system of the digital color copying machine. The printer controller 201 included in the printer section 200 controls the print action. The printer controller 201 including a CPU is connected to a control ROM 202 storing a control program, a data ROM 203 storing various data including gamma correction tables, and a random access memory (RAM) 204.

The printer controller 201 receives analog signals from a $V_O$ sensor 44, an AIDC sensor 210, an ATDC sensor 211, a temperature sensor 212 and a humidity sensor 213 as well as a color balance switch 216. The $V_O$ sensor 44 detects the potential of the surface of the photoconductor drum 41. The AIDC sensor 210 detects a toner amount on the photoconductor drum 41 formed in the standard image-forming conditions (the surface potential $V_O$, the development bias potential $V_B$ and the exposure light quantity) for each color in order to set optimum $V_O$, $V_B$ and the exposure light quantity. Various key-input data with an operational panel 221 (FIG. 5) are received by the printer controller 201 via a parallel I/O 222. Input data with a tablet editor 232 (FIG. 11) are also received by the printer controller 201.

The printer controller 201 controls a copying controller 231 and a display panel 232 according to the data from the operational panel 221 and the data ROM 203. Further, it also controls high voltage units 243 and 244 for generating the grid voltage $V_G$ of the sensitizing charger 43 and for generating the development bias voltage $V_B$ of the development unit 45a–45d.

The printer controller 201 is also connected to the image signal processor 20 via an image data bus and performs gamma correction on the basis of the image signal received via the image data bus with reference to the data ROM 203. Then, the printer controller 201 controls the laser diode driver 263 via a drive I/O 261 and a parallel I/O 262, and the laser diode controller 220 controls the emitting of the laser diode 264. The gradation is expressed by modulating the light intensity of the laser beam emitted from the laser diode 264.

Figure 5:
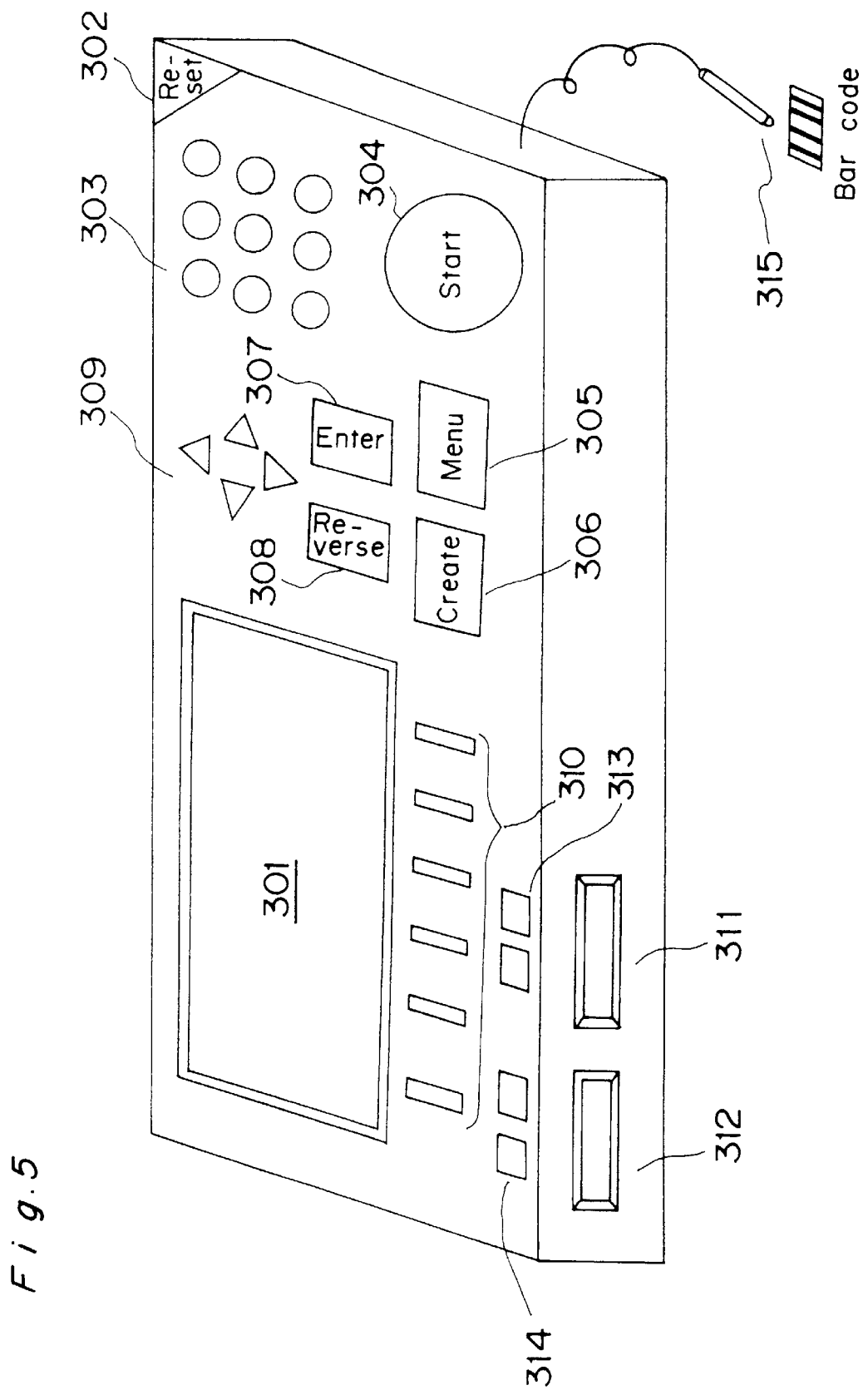
FIG. 5 is a perspective view of an operational panel.

FIG. 5 shows the operational panel 221, wherein a liquid crystal display 301 displays for example the mode designated by the operation with this panel 221, the explanation of the operating procedures for a user, the status such as jam or copy. A panel reset key 302 is provided for initializing all the modes. Keys 303 consist of ten-keys for setting the number of copies and a clear key for clearing the key-inputs. A start key 304 is provided for starting a copy operation. If an image quality menu key 305 is pressed, a menu for image quality control is displayed in the liquid crystal display 301, and a user can control the image quality by operating the menu. If a create menu key 306 is pressed, a menu for setting various create functions is shown in the image plane of the liquid crystal display 301, and a user can set various functions or modes by operating the menu. An enter key 307 is used as a determination key or a next image plane key in the above-mentioned various menus. A reverse key 308 is used as a cancel key or a preceding image plane key in the manus. Cursor keys 309 are used for selecting various settings on the image planes. Multi-function keys 310 have different meanings in each selection menu shown in the liquid crystal display 301. The operational panel 221 has two inlets 311 and 312 for inserting two IC cards at maximum, and a key 313 for program call/register and a key 314 for IC card discharge are provided for each inlet. Further, a pen 315 is provided to read a bar code to set various modes.

Figure 6:
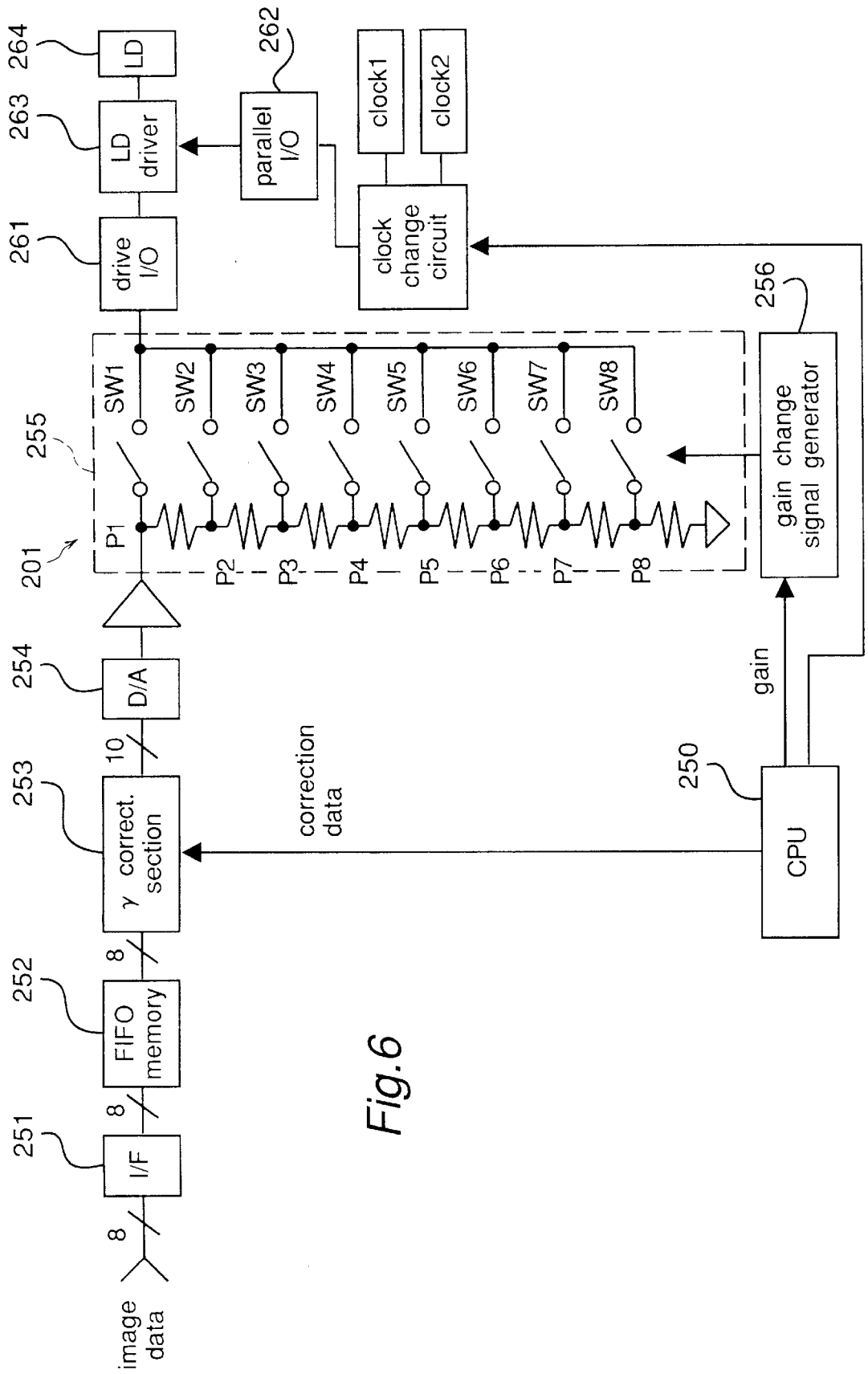
FIG. 6 is a block diagram of the image data processing in the printer controller.

FIG. 6 shows image data processing in the printer controller 201. Multi-level (8-bit) image data received from the image signal processor 20 are received through an interface 251 and are stored in a first-in first-out (FIFO) memory 252. The FIFO memory 252 is a line buffer memory which can store gradation data of a prescribed line number in the main scan direction and it buffers the difference of the clock frequencies between the image reader section 100 and the printer section 200. The data in the FIFO memory 252 are inputted to a gamma correction section 253. Gamma correction data in the data ROM 203 (FIG. 4), which stores various gamma correction data, are sent to the gamma correction section 253 by the CPU 250, and the gamma correction section 253 corrects the input data to send a corrected output level to a D/A converter 254. The D/A converter 254 converts the digital input data to an analog voltage, which is next amplified by an amplifier 255 with a gain for a gain signal generator 256 by the CPU 250 and is sent through a drive I/O 261 to a laser diode (LD) driver 263. The driver 263 drives the laser diode 264 to emit a light of an intensity in correspondence to the digital image data.

On the other hand, the CPU 250 sends a signal to a clock change circuit 257 to select a clock generator 258 or 259, and the generated clock signals are sent via a parallel I/O 262 to the laser diode driver 263 to modulate the image data with the clock signals. By selecting the clock generators 258, 259, a duty ratio (for example 100% and 80%) of the light emitting signals can be changed.

(C) Image Stabilization

The gradation characteristic is determined basicly by the sensitivity characteristic of the photoconductor, the development characteristic, and the setting values of the sensitizing potential $V_O$, the development bias voltage $V_B$ and the decay potential $V_s$ of the electrostatic latent image. In the image reproduction especially of a color image, the output image is required to be proportional to the document density, and the image stabilization is performed according to this requirement. Besides this standard gradation characteristic, in the present invention, a user can select a desired gradation characteristic, and the gradation control system is operated in combination with the image stabilization system, to stabilize always the selected gradation characteristic.

Figure 7:
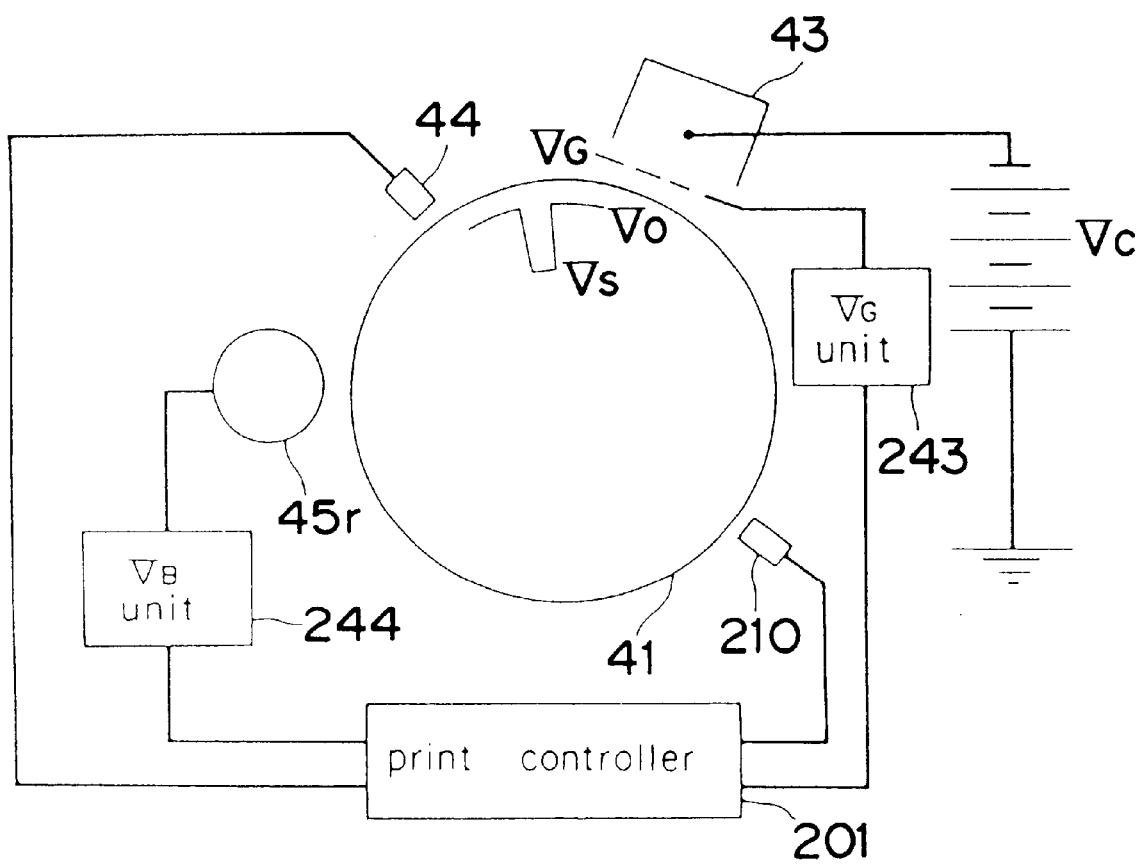
FIG. 7 is a schematic diagram of the arrangement of a sensitizing charger and a development unit around a photoconductor.

Before explaining the image stabilization, the electrophotographic process is explained with reference to FIG. 7 of a schematic diagram of image forming section including a photoconductor drum 41 and a roller of a development unit 45r. A sensitizing charger 43 of grid voltage $V_G$ (discharge voltage $V_C$) is arranged opposite to the photoconductor 41. The negative grid voltage $V_G$ is applied to the grid of the charger 43 by a grid voltage generator 243. The surface potential $V_o$ of the photoconductor just after the sensitization before the exposure can be taken almost equal to the grid voltage $V_G$. Therefore, the surface potential $V_o$ can be controlled by the grid voltage $V_G$. The surface potential $V_o$ is detected with the $V_o$ sensor 44 which is an electrometer.

First, before the exposure of laser beam, a negative surface potential $V_o$ is applied to the photoconductor drum 41 by the sensitizing charger 43, while a negative, lower bias voltage $V_B$ ($|V_B|<|V_o|$) is applied to the roller of the development unit 45r by a development bias voltage generator 244. That is, the voltage of the development sleeve is $V_B$.

A laser beam exposes the photoconductor, and the potential at the exposure position decreases from the surface potential $V_o$ to an attenuation potential $V_I$ of the electrostatic latent image or the surface potential just after the laser exposure. If the attenuation potential $V_I$ becomes lower than the development bias voltage $V_B$, toners carried to the surface of the sleeve of the development unit 45r adhere to the photoconductor drum 41.

It is not good that the difference between the surface potential $V_o$ and the development bias voltage $V_B$ is too large or too small. Further, the amount of adhered toners increases with increasing the development voltage $\Delta V = |V_B - V_I|$. On the other hand, the attenuation potential $V_I$ changes with the surface potential $V_o$ even at the same quantity of exposure light. Then, for example, the surface potential $V_o$ and the development bias voltage $V_B$ are changed by keeping the difference between the surface potential $V_o$ and the development bias voltage $V_B$ constant. Then, the difference between the development bias voltage $V_B$ and the attenuation potential $V_I$ changes or the amount of adhered toners can be changed to control the density (for example Japanese patent laid open Publication No. 271,764/1991). Further, the gain of laser emission can be changed according to the photoconductor sensitivity information obtained with the $V_o$ sensor 44.

The electrophotographic process is affected by the environment because it deals with electrostatic charges, and the development characteristic and the photoconductor characteristic mainly change according to the environment. In order to compensate such changes to keep the maximum density level constant, for each of the four colors, a standard toner image is formed by developing an electrostatic latent image formed in the standard image-forming conditions, and the amount of toners adhered to the standard toner image is detected with the AIDC sensor 210. Then, the development bias voltage $V_B$ and the grid potential $V_G$ are changed according to the detected value to select the development voltage ($\Delta V$) in order to keep the maximum density level constant. This is called as automatic image density control (AIDC). Further, it is also needed to remove a fog.

(D) Standard Gradation Characteristic

Figure 8:
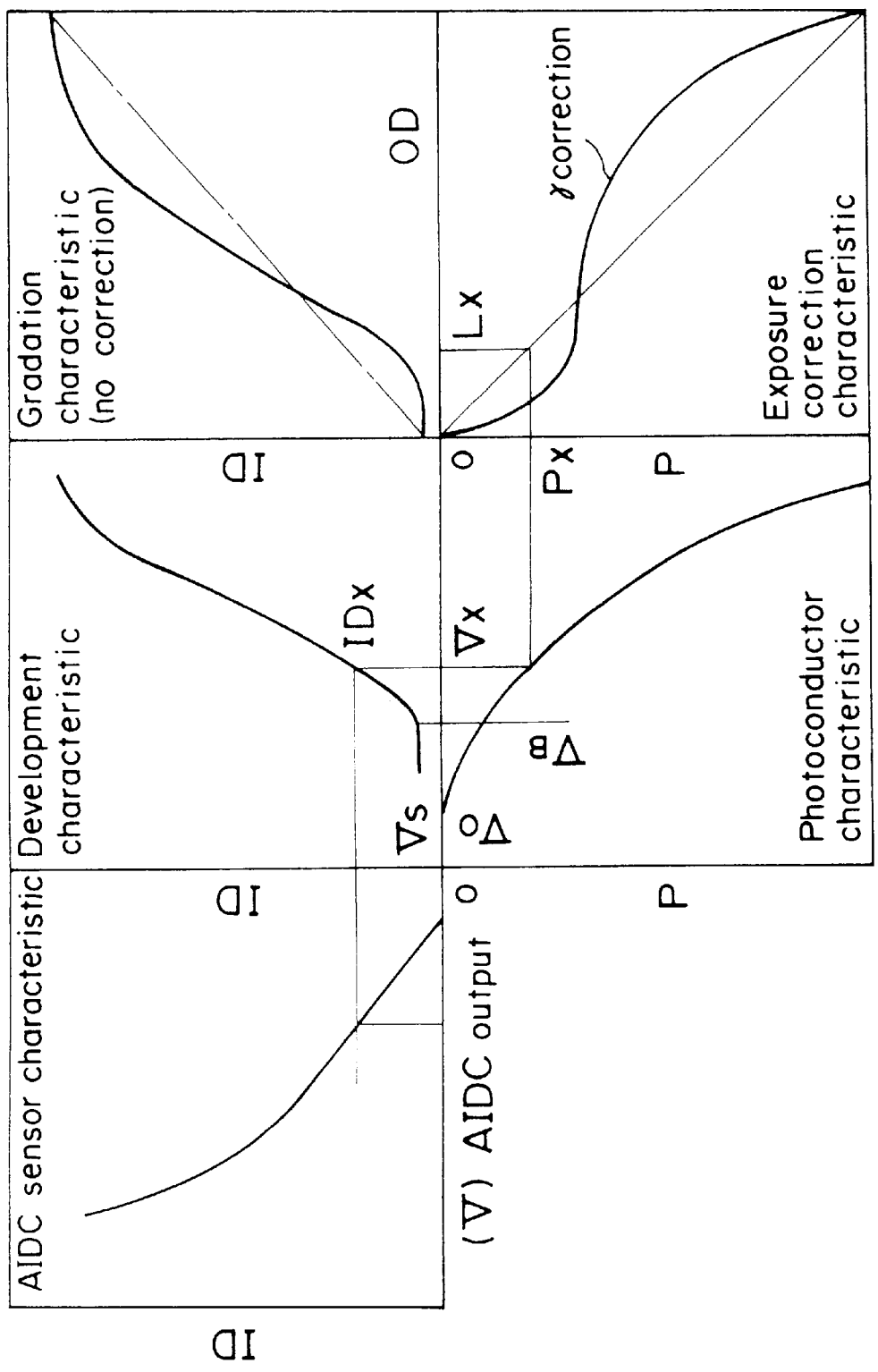
FIG. 8 is a graph of the sensitometry in inversion development.

Next, linear gradation correction is explained as a standard. Especially for a color image, the linear characteristic is needed basicly as a standard. FIG. 8 shows a diagram of sensitometry in the inverted development system. A value of image signal (image input level OD) inputted from the image reader section 100 is linear against the document density. If the laser light quantity P(Lx) is changed linearly against the image input level Lx, the gradation characteristic or a relation of output image density (ID) of the image printed actually changes nonlinearly against the output image density (ID). The surface potential $V_s$ of the photoconductor decays with the laser emission, or the surface potential decays nonlinearly gradually with increasing laser light quantity. Further, the development bias voltage $V_B$ is determined against the sensitizing potential $V_o$ to remove a fog, and the output image density ID($V_s$) is obtained for the development potential difference ($V_B - V_s(Lx)$). This development characteristic also has nonlinearity. Then, as will be explained later, the laser light quantity P(Lx) is changed not linearly, but nonlinearly against the image input level Lx in order to realize the linear characteristic wherein the output image density is linear against the input level.

Figure 9:
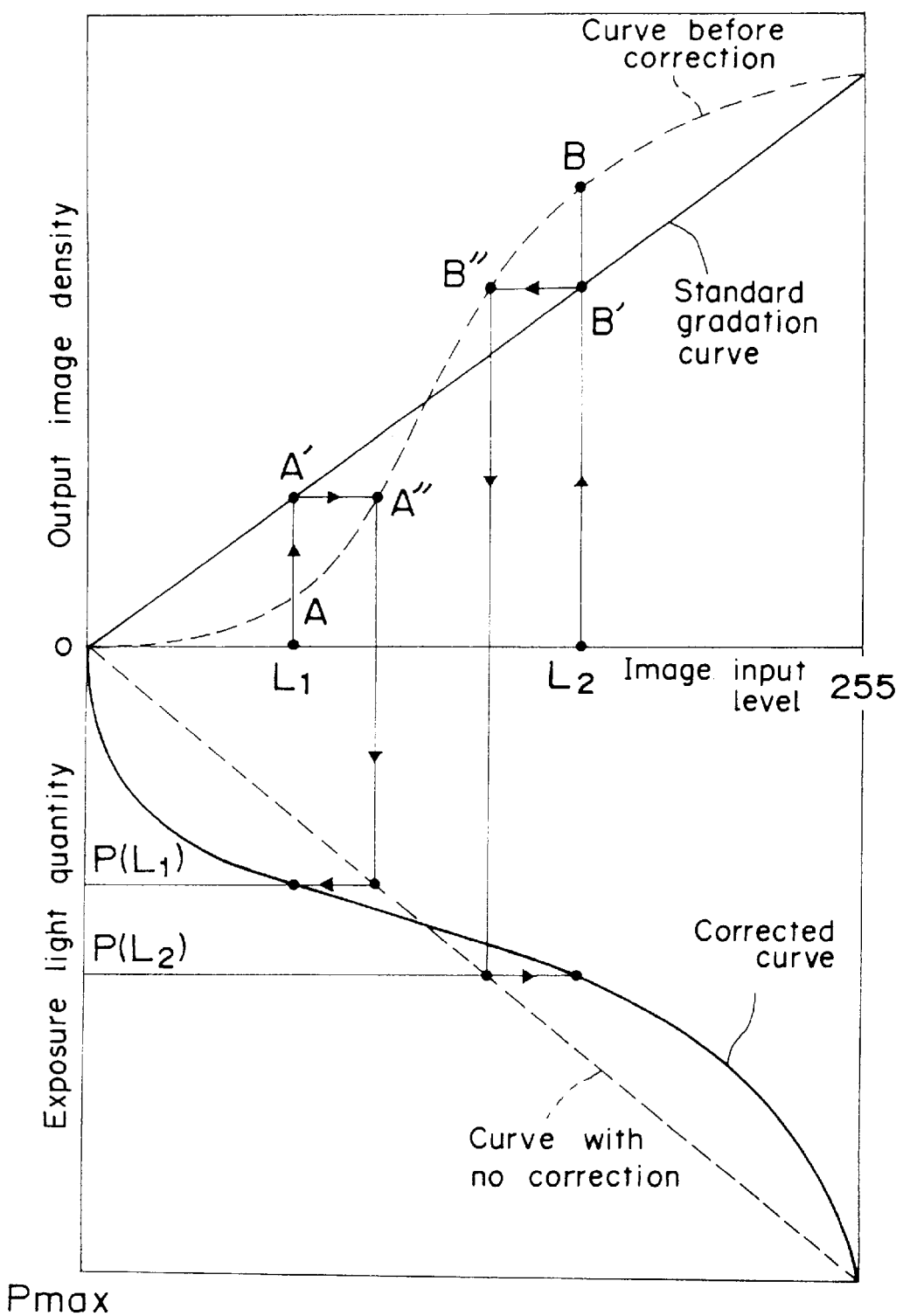
FIG. 9 is a diagram for obtaining standard gradation correction data.

FIG. 9 illustrates how to determine the gradation correction data to realize the linear relation of the output image density against the input level or the standard gradation characteristic. If the image input data is converted linearly to the laser exposure quantity to expose the photoconductor, as shown in the lower half of FIG. 9, the gradation curve becomes nonlinear as shown as a dashed line in the upper half of FIG. 9. The light-emission characteristic for realizing the object standard gradation characteristic displayed as a dashed line is displayed as a solid curve in the lower half of FIG. 9. That is, when a point A on the dashed line (image input level $L_1$) is converted to a point A' on the solid line, the laser exposure quantity $P(L_1)$ at a point A" on the dashed line having the same output as the point A' is outputted for the input image data $L_1$. Similarly, when a point B on the dashed line (image input level $L_2$) is converted to a point B' on the solid line, the laser exposure quantity $P(L_2)$ at a point B" on the dashed line having the same output as the point B' is outputted for the input image data $L_2$. Thus, the laser exposure amount for an image input level can be obtained as a solid curve in the lower part of FIG. 9.

(E) Gradation Selection

It is explained above how to realize the standard gradation characteristic for an output image which is fidel to the document image. In the present invention, a user can select different gradation curves from the standard one.

In the selection of gradation characteristic, the type of the shape of gradation curve and the degree of the change of the shape of the gradation curve from the standard gradation curve are selected in two steps, for the convenience of a user.

Figure 10A:
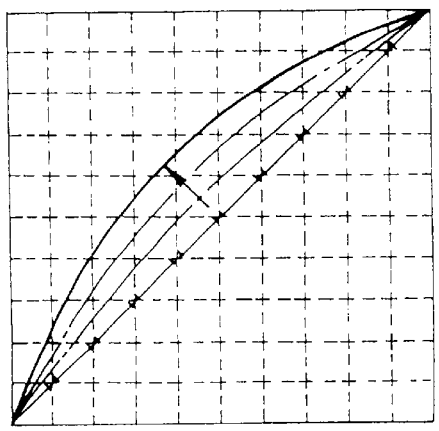
FIGS. 10(a), (b), (c) and (d) are schematic diagrams of different shapes of gradation curves and of the steps of emphasis of the shapes.
Figure 10B:
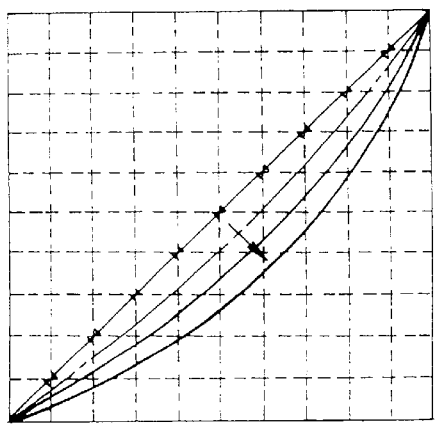
Figure 10C:
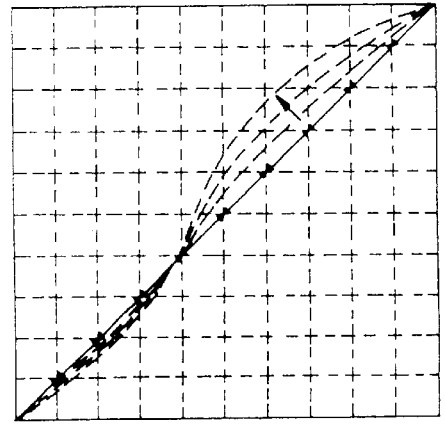
Figure 10D:
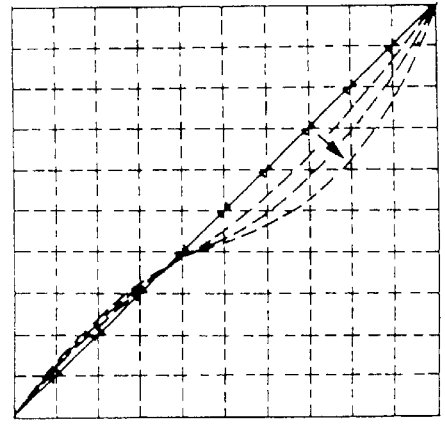

FIGS. 10(a), (b), (c) and (d) show schematically a concept of the type of the shape of gradation curve and the degree of the change of the shape of gradation curve from the standard gradation curve. There are available four types of the shape of gradation curve as to the relative change against the standard gradation curve. Further, by changing the step (level) of the change of the shape of the selected type of gradation curve, an infinite number of gradation curves can be realized.

In the low-density emphasis type (a), the gradation curve is convex upward. This gradation curve gives a heavy image.

In the high-density emphasis type (b), the gradation curve is convex downward. This gradation curve gives an image like a pastel picture. Further, an image dark as a whole can be corrected.

In the intermediate density emphasis type (c), the gradation curve is convex upward largely at high levels while convex downward a little at low levels. This gradation curve gives a colorful image or a sharp image.

In the intermediate density non-emphasis type (d), the gradation curve is convex downward largely at high levels while convex upward a little at low levels. This gradation curve gives a soft image or a smooth image.

A point of a gradation curve of the intermediate density emphasis or non-emphasis type (c), (d) with the straight line can be determined as the same point as the intersection with the linear line (FIG. 9).

Next, the selection of gradation curve is explained concretely. First, the selection with use of the operational panel 221 is explained. In this case, the type of the shape of gradation curve is first selected, and the degree of the change of the selected type of gradation curve from the standard gradation curve is selected next.

Figure 12:
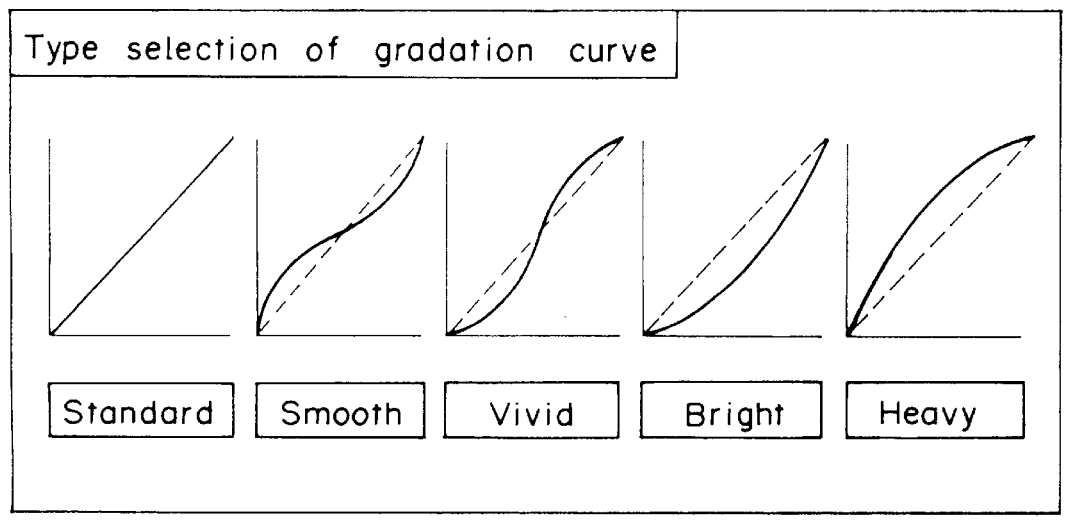
FIG. 12 is a diagram of an image for selecting the type of gradation curves.
Figure 13:
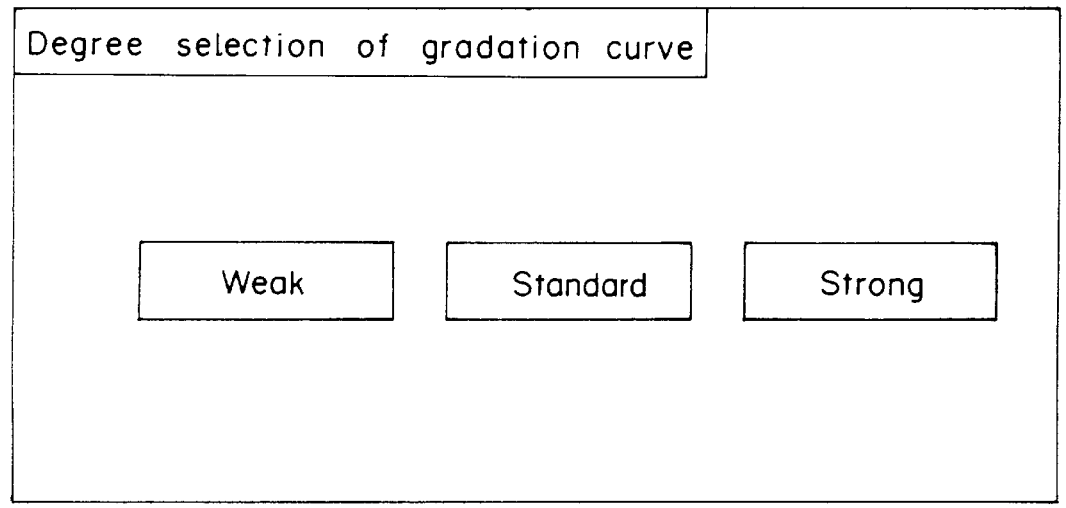
FIG. 13 is a diagram of an image for selecting the level of gradation curves.

First, by pressing the key 306, an image for selecting the type of gradation curve is displayed on the screen of the display 301. FIG. 12 shows a selection image displayed on the screen. In the selection image, the gradation curves shown in FIGS. 10(a)–(d) as well as the standard gradation curve are displayed each with a word for representing a characteristic of the gradation curve such as "standard", "smooth", "bright", "light" or "heavy". A desired type of the gradation curve among the five is selected with the keys 310 provided below the display 301. When a gradation curve is selected with the keys 310, words such as "strong", "standard" and "weak", for representing the degree of the change of the gradation curve from the standard one are represented in the liquid crystal display 301. A user can select one of them with the keys 310 to set the degree of the change. That is, the gradation curve can be selected in the three levels of the change. If the "strong" is selected, a gradation curve far from the standard one is selected in the three gradation curves of the selected type of gradation curve. If the "weak" is selected, a gradation curve near the standard one is selected in the three gradation curves. If the "standard" is selected, an intermediate gradation curve is selected in the three gradation curves.

In the above-mentioned selection, after the selection of the type of the gradation curve, an input of the level of the change of the gradation curve is urged in the display. If the level is not inputted, the level "0" or the standard object curve is selected.

Figure 11:
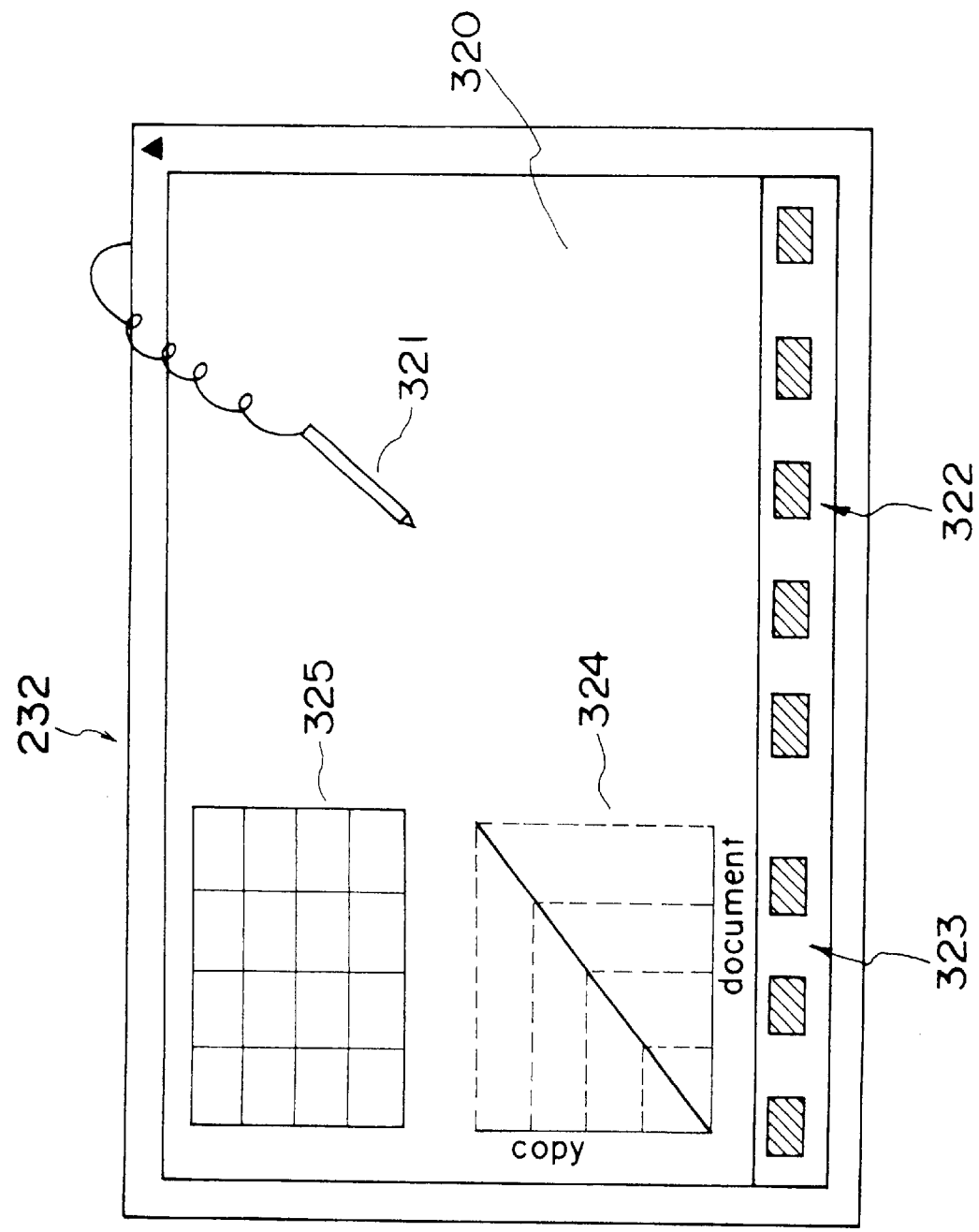
FIG. 11 is a diagram pf a tablet editor.

Further, the gradation curve can also be selected with a tablet editor 232 shown in FIG. 11. In a coordinate input section 320 of the tablet editor 232, a pen 321 is used to designate a position on the document, and a partial edition among various edition functions can be conducted. The coordinate input section 320 also has key groups 322 and 323 of five and three keys for setting modes. That is, the mode keys 322, 323, gradation curve selection section 324 and a color pallet 325 are printed in the coordinate input section 320, and the coordinate input section 320 can be used as a mode set section or a level set section.

The mode keys 322 and 323 are used to set various modes, and a mode can be set by pressing with the pen 321. Therefore, the type and the degree of the change of the gradation curve can be selected with the keys 322 and 323.

In the present embodiment, the number of necessary gradation curves is (4×3+1)×4×28=1456 in correspondence to the four types of gradation curve and the standard gradation curve, four colors of cyan, magenta, yellow and black and 28 levels obtained with AIDC sensor 210. The gradation correction tables in correspondence to the gradation curves are stored in the data ROM 203.

On the other hand, 112 standard gradation curves may be stored in correspondence to combinations of the four colors and 28 levels, and a gradation correction curve can be calculated according to the selected type of object gradation curve and a standard gradation curve in correspondence to the color and the level. This decreases the memory capacity needed for the gradation correction curves.

(F) Color Masking Correction

In the color masking processor 25, read density data DR, DG and DB of red, green and blue are converted to data C, M and Y of cyan, magenta and yellow for image reproduction, as follows:

$$\begin{pmatrix} C \\ M \\ Y \end{pmatrix} = (B) \times \begin{pmatrix} DR \\ DG \\ DB \end{pmatrix}. \qquad (1)$$

The matrix B is a masking matrix consisting of 3×3=9 masking coefficients.

$$(B) = \begin{pmatrix} B11 & B12 & B13 \\ B21 & B22 & B23 \\ B31 & B32 & B33 \end{pmatrix}. \qquad (2)$$

wherein B11, B22 and B33 denote the coefficient of the cyan main component, of the magenta main component and of the yellow main component, respectively. Fundamentally, the dominant color has the largest main component.

Figure 14:
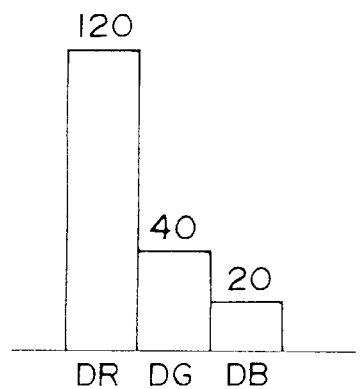
FIG. 14 is a graph of read density data of a document having a cyan-like color.

An example of chroma control is explained for the masking correction for a document of cyan-like color (refer FIG. 14). The read density DR, DG and DB of the document are 120, 40 and 20, respectively. Then, $$C = B11 \times 120 + B12 \times 40 + B13 \times 20, \qquad (3)$$

$$M = B21 \times 120 + B22 \times 40 + B23 \times 20, \qquad (4)$$

and $$Y = B31 \times 120 + B32 \times 40 + B33 \times 20. \qquad (5)$$

Eq. (3) shows that the cyan component increases with increasing B11. Eq. (4) shows that the magenta component decreases with increasing the minus components B12 and B13. Eq. (5) shows that the yellow component decreases with increasing the minus components B21 and B23. Further, a color has a high chroma with increasing the minus components except the main component B11, B22 and B33. However, it is required that the sums of the columns and the rows of the matrix and B11+B22+B33 have to be kept constant in order to determine the entire density. On the other hand, if the main components B11, B22 and B33 decrease and the other terms increase, the main component (cyan) decreases or the main color becomes more impure to decrease the chroma.

Figure 15:
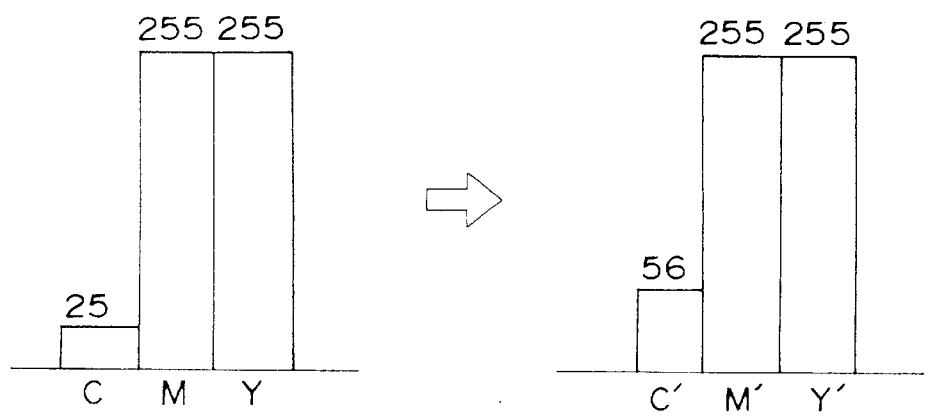
FIG. 15 is a diagram of a masking matrix in correspondence to masking code MC.

As an example, we assume that a curve "a3" is selected to decrease the chroma. The X color of (C, M, Y)=(25, 255, 255) in FIG. 15 are processed with the curve "a3" to be converted to (C', M', Y')=(56, 255, 255). Then, the cyan of an impure component of the X color consisting of red mixed with cyan increases to a large extent to lower the chroma remarkably.

Figure 16:
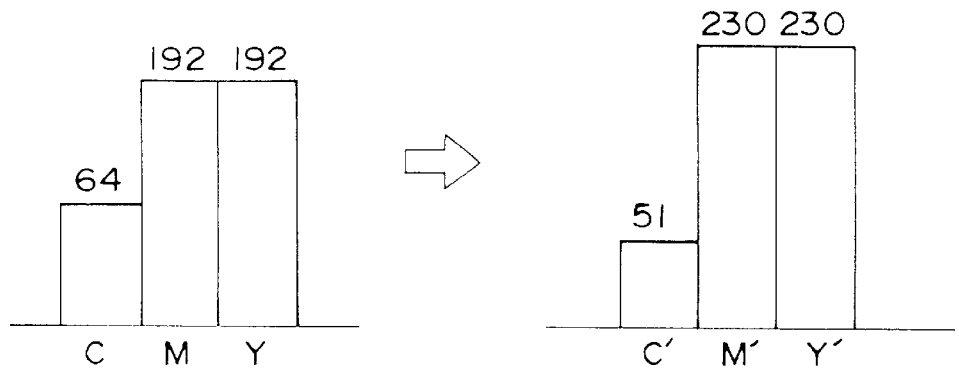
FIG. 16 is a diagram of masking processing of X color.

On the contrary, we assume that a curve "c3" is selected to decrease the chroma. The Y color of (C, M, Y)=(64, 192, 192) in FIG. 16 are processed with the curve "c3" to be converted to (C, M, Y)=(51, 230, 230). Then, the cyan of an impure component of the Y color consisting of red mixed with cyan decreases while the magenta and yellow of main components increase to a large extent to increase the chroma remarkably.

In the change of chroma, the chroma decreases remarkably in the order of "a1", "a2" and "a3" or in the order of "d1", "d2" and "d3". Therefore, when a gradation curve to enhance chroma is selected, if a masking coefficient for lowering the chroma is selected, the change of chroma can be suppressed while only the gradation curve can be changed.

When the gradation characteristic is changed by a user, hue and chroma may also change if the color masking coefficients were kept constant. As shown in FIG. 2, the color masking coefficient can be changed in a masking processor 25 according to the gradation characteristic selected with the operational panel 221. Then, if the gradation characteristic to increase chroma is selected, a color masking coefficient for decreasing chroma is selected.

FIG. 17 shows examples of masking matrix in correspondence to masking code MC. The masking matrices are arranged in the order of high chroma to low chroma in the order of MC3, MC2, MC1, MC0, MC4, MC5 and MC6.

(G) Flow of Printer Control

Figure 18:
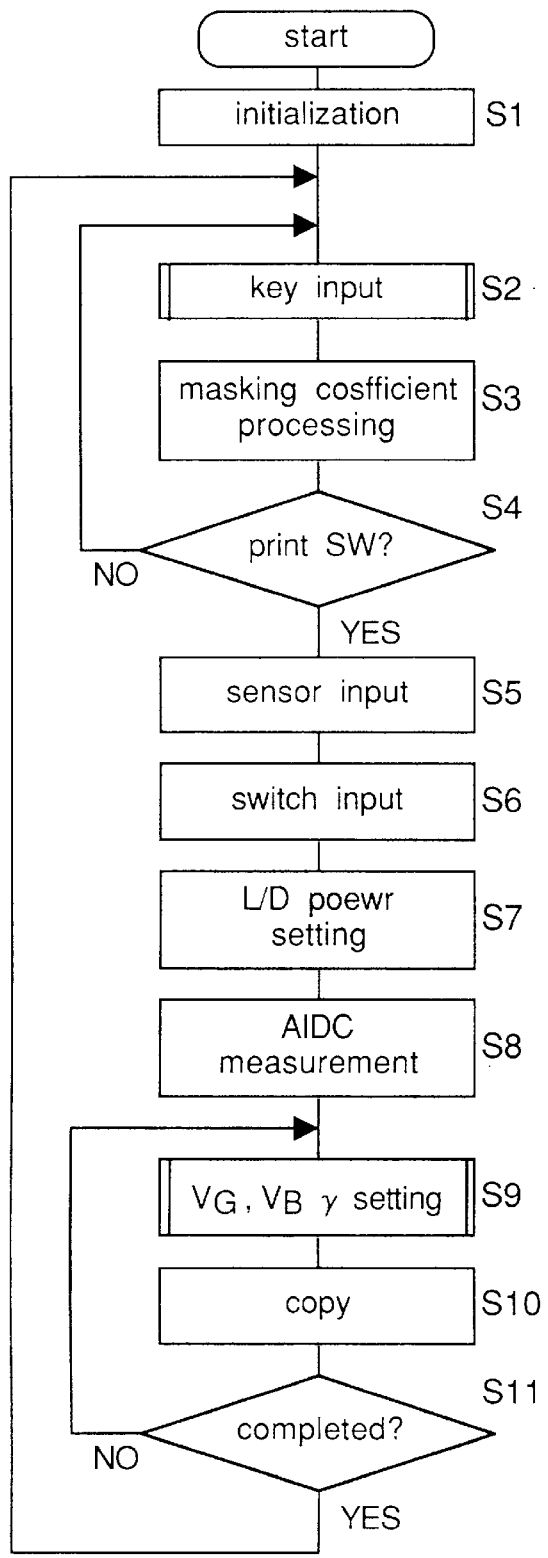
FIG. 18 is a chart of the main flow of the printer controller.

FIG. 18 shows a main flow of the printer controller 201. First at step S1, the initialization of the printer controller 201 is performed, and at step S2, the key-input processing of the operational panel 221 is performed (refer FIG. 19). Next, at step S3, masking coefficient processing is performed (refer FIGS. 20(a) and (b)). Then, at step S4, the start key 304 in the operational panel 221 is waited to be pressed. If it is decided at step S4 that the start key 304 is pressed, the sensor inputs are received at step S5. Next, at step S6, the input signals of the various switches of the operational panel 221 are received to be stored in the RAM in the printer controller 201. Then, at step S7, the level of the maximum light emission of the laser diode 264 is set by changing the gain of the gain switch 255 according to the values obtained at steps S5 and S6.

Next, at step S8, the above-mentioned automatic image density control (AIDC) is performed. That is, after the grid voltage $V_G$ and the development bias voltage $V_B$ are set to be prescribed standard values, a toner image of a standard image pattern is formed on the photoconductor drum 41 and the amount of adhered toners of the standard toner image is measured with the AIDC sensor 210. The detected value is stored in the RAM 204 in the printer controller 201. Next, at step S9, the density detection level LBA is selected according to the amount of adhered toners measured at step S8, and the grid voltage $V_G$, the development bias voltage $V_B$ and the code of the gradation correction table are also selected according to the density detection level LBA. Next, at step S10, a known copy action is carried out by using the selected grid voltage $V_G$, the selected development bias voltage $V_B$ and the gamma correction table until the copy action is decided to be completed at step S11.

In case of a color image, a copy is needed to be processed for the four colors of cyan, magenta, yellow and black successively or the copy action is repeated for each color.

Figure 19:
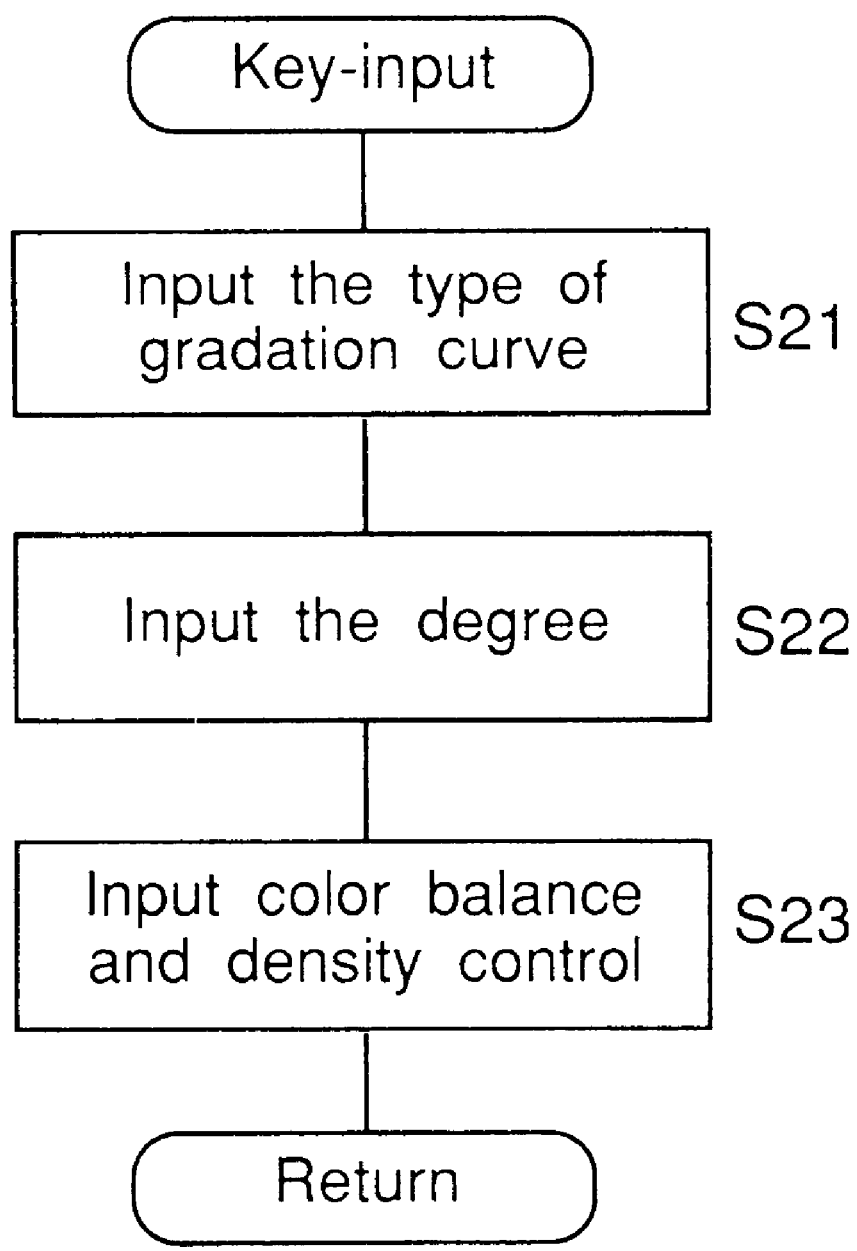
FIG. 19 is a flowchart of key-input processing.

FIG. 19 shows a flow of the key-input processing (FIG. 18, step S2). First, the type of the shape of the gradation curves are inputted (step S21), and next the degree of the change of the shape from the standard gradation curve is inputted (step S22). Finally, the color balance and the density control value are inputted with the color balance switch 216 and with the operational panel 221 (step S23). Then, the flow returns to the main flow.

Figure 20A:
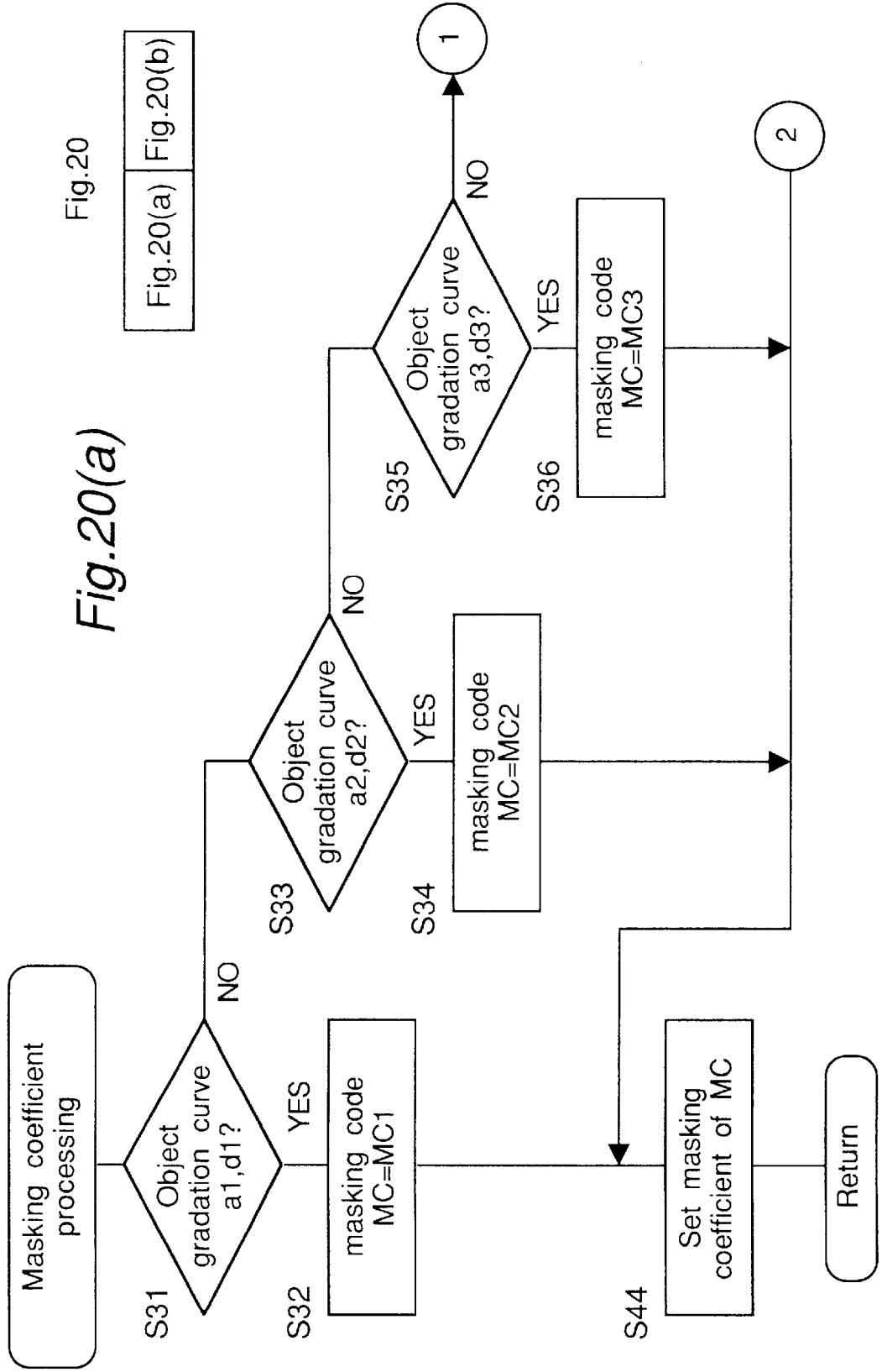
FIGS. 20(a) and 20(b), is a flowchart of masking coefficient processing.
Figure 20B:
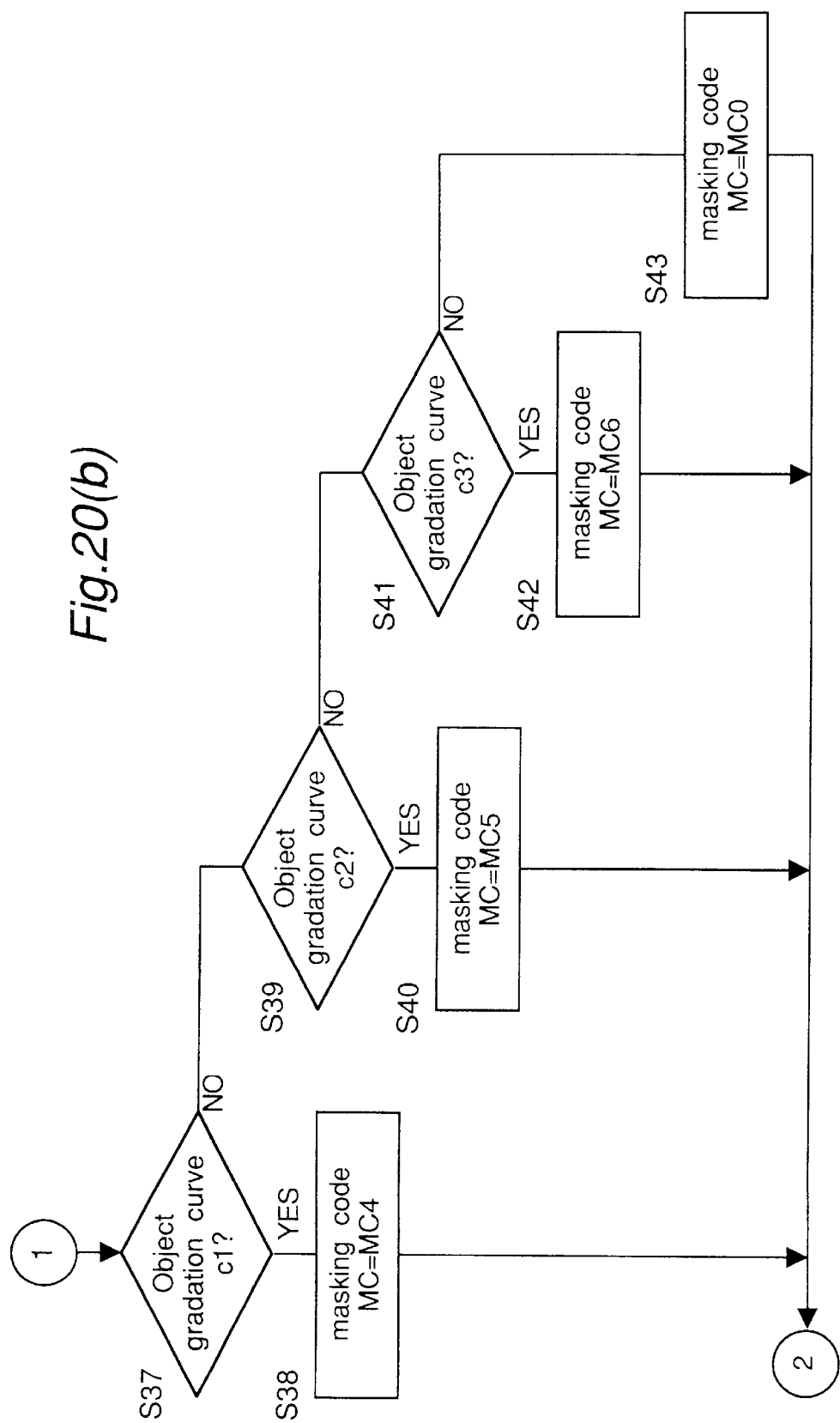

FIGS. 20(a) and 20(b) show a flow of masking coefficient processing (FIG. 18, step S3) wherein a masking coefficient MC is set according to the selected object gradation curve. If it is decided that the object gradation curve is "a1" or "d1" (YES at step S31), the masking code MC is set to be MC1 (step S32). If it is decided that the object gradation curve is "a2" or "d2" (YES at step S33), the masking code MC is set to be MC2 (step S34). If it is decided that the object gradation curve is "a3" or "d3" (YES at step S35), the masking code MC is set to be MC1 (step S36). If it is decided that the object gradation curve is "c1" (YES at step S37), the masking code MC is set to be MC4 (step S38). If it is decided that the object gradation curve is "c2" (YES at step S39), the masking code MC is set to be MC5 (step S40). If it is decided that the object gradation curve is "c3" (YES at step S41), the masking code MC is set to be MC6 (step S42). If the object gradation curve is not among the above-mentioned ones (NO at step S41), the masking code MC is set to be MC0 (step S43). Finally, the masking coefficient in correspondence to the selected masking code is set (step S44), and the flow returns to the main flow.

Figure 21:
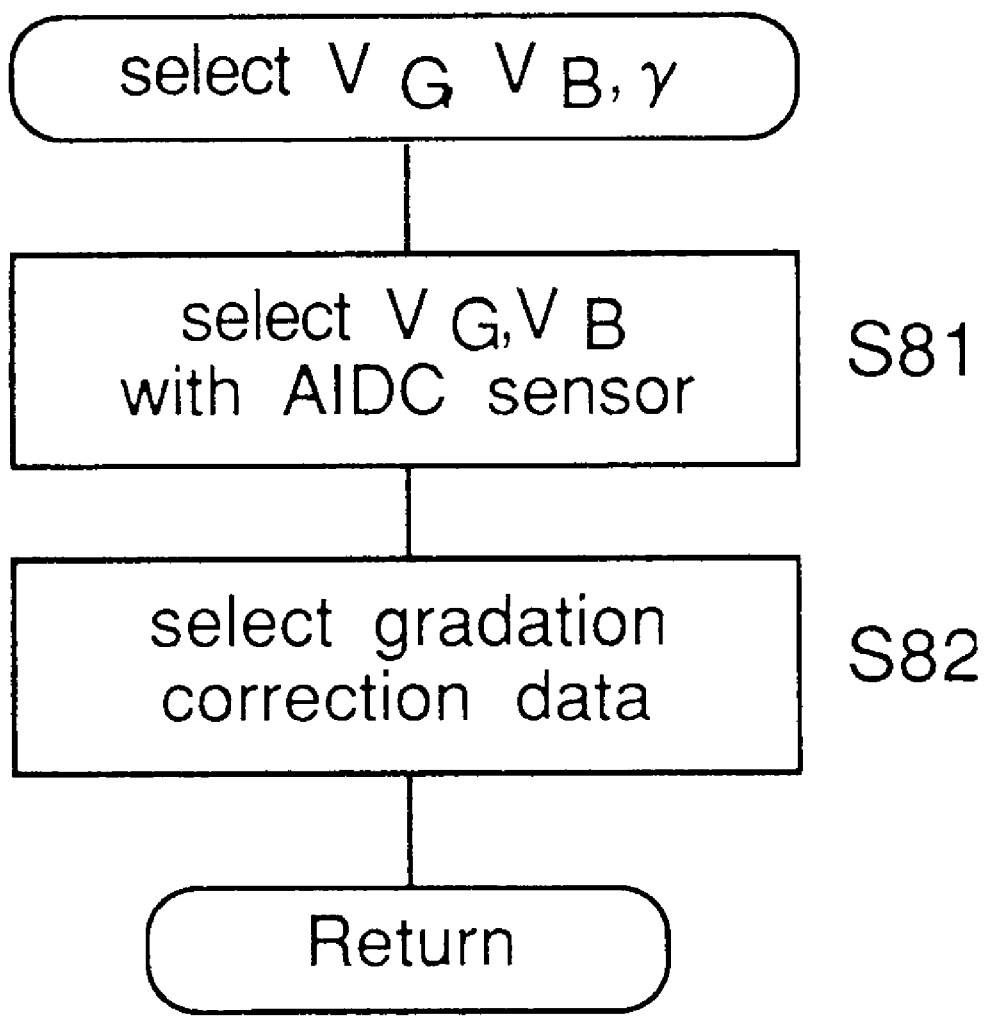
FIG. 21 is a flowchart of the selection of $V_G$, $V_B$ and gradation correction curve.

FIG. 21 shows a flow of the selection of $V_G$, $V_B$ and the gradation data (FIG. 14, step S9). First, the grid voltage $V_G$ and the development bias voltage $V_B$ are selected according to the detected value with the AIDC sensor 210 (step S41). Next, a gradation correction table is selected according to the object gradation curve and ($V_G$ and $V_B$) (step S42). Then, the flow returns to the main flow.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image forming apparatus comprising:

a masking processor which converts input multi-tone image signals of red, green and blue to multi-tone image signals of yellow, magenta and cyan for printing;

a manual input panel which changes a gradation curve by manual input;

a color balance control means which changes the masking coefficients used for the conversion from red, green and blue to yellow, magenta and cyan by said masking processor according to the gradation curve changed by said manual input panel; and a conversion circuit which converts the multi-tone image signals of yellow, magenta and cyan to light quantity data of a beam for exposing a photoconductor to form an image on the photoconductor according to the gradation curve determined by said manual input panel.

2. The image forming apparatus according to claim 1, wherein said color balance control means selects a masking coefficient among a plurality of masking coefficients according to the change of gradation curve by said manual input panel.

3. The image forming apparatus according to claim 2, wherein said plurality of masking coefficients includes a masking coefficient for high chroma and one for low chroma; wherein when said manual input panel determines a gradation curve appropriate for high chroma reproduction, said color balance control means selects the masking coefficient for low chroma, while when said manual input panel determines a gradation curve appropriate for low chroma reproduction, said color balance control means selects the masking coefficient for high chroma.

4. The image forming apparatus according to claim 1, wherein said manual input panel comprises:

a memory which stores a plurality of gradation curves representing the relation of a density of reproduced image to an input multi-tone image signal, said gradation curves being divided into types based on the shape of the gradation curves;

a first manual input key which selects one of said types; and a second manual input key which selects a gradation curve from gradation curves belonging to said type selected by said first manual input key.

5. An image forming apparatus comprising:

a manual input panel which changes a gradation curve which represents a relation of an input image signal to a density of a reproduced image;

a memory which stores a plurality of masking coefficients;

a selection means for selecting a masking coefficient from the masking coefficients stored in said memory in correspondence with the gradation curve determined by the manual input panel;

a masking processor which multiplies the multi-tone image signal with the masking coefficient selected by the selection means to convert the input image signal to the light quantity data of a beam for exposing a photoconductor; and a conversion circuit which corrects the light quantity data obtained by said masking processor to the light quantity data according to the gradation curve determined by the manual input panel to form an image on a photoconductor.

6. The image-forming apparatus according to claim 5, wherein said manual input panel comprises a key-input means which can be operated manually.

7. A digital color image forming apparatus comprising:

a manual input panel for manually inputting a desired gradation curve;

a masking processor which multiplies an image signal with a masking coefficient determined according to the gradation curve inputted with said manual input panel to send the image signal for a print color;

a conversion circuit which converts the image signal to print data in correspondence with light quantity data according to the gradation curve inputted by said manual input panel; and a printer which prints the image by exposing a photoconductor based on said print data.

8. A method for forming a color image comprising the steps of:

setting a gradation characteristic which is a relation of input image signals to the density of the reproduced image according to a manual input;

setting a color masking coefficient according to the gradation characteristic set in the setting step of gradation characteristic;

converting the input image signal to a color image signal by using the color masking coefficient set in the above step;

converting the converted color image signal to a light quantity data of a beam for exposing a photoconductor according to the gradation characteristic set in the above step; and controlling the beam according to the light quantity data.

9. An image forming apparatus comprising:

a change means for changing the gradation curve which represents a relation of an input image signal to a density of a reproduce image, said change means including a key-input means which can be operated manually;

a memory means for storing a plurality of masking coefficients;

a selection means for selecting a masking coefficient from the masking coefficients stored in said memory means in correspondence to the gradation curve determined by the change means;

a masking means for multiplying the multi-tone image signal with the masking coefficient selected by the selection means to convert the input image signal to the light quantity data of a beam for exposing a photoconductor; and a conversion means for correction the light quantity data obtained by said masking means to the light quantity data according to the gradation curve determined by the change means to form an image on a photoconductor.

* * * * *